(12) United States Patent
Kanizo

(10) Patent No.: US 11,118,712 B2
(45) Date of Patent: Sep. 14, 2021

(54) WALL SOCKET

(71) Applicant: WATER SOCKET LTD., Bat Yam (IL)

(72) Inventor: Shlomo Kanizo, Bat Yam (IL)

( * ) Notice: Subject to any disclaimer, the term of this patent is extended or adjusted under 35 U.S.C. 154(b) by 0 days.

(21) Appl. No.: 17/023,499

(22) Filed: Sep. 17, 2020

(65) Prior Publication Data
US 2021/0003240 A1 Jan. 7, 2021

Related U.S. Application Data

(63) Continuation-in-part of application No. 15/554,258, filed as application No. PCT/IL2016/050211 on Feb. 24, 2016, now abandoned.

(30) Foreign Application Priority Data

Mar. 3, 2015 (IL) .......................................... 237545

(51) Int. Cl.
| | |
|---|---|
| *F16L 37/60* | (2006.01) |
| *F16L 37/05* | (2006.01) |
| *F16L 5/02* | (2006.01) |
| *E03C 1/02* | (2006.01) |
| *F16L 37/091* | (2006.01) |

(52) U.S. Cl.
CPC .............. *F16L 37/60* (2013.01); *E03C 1/021* (2013.01); *F16L 5/027* (2013.01); *F16L 37/05* (2013.01); *F16L 37/0915* (2016.05); *Y10T 137/698* (2015.04)

(58) Field of Classification Search
CPC . F16L 37/60; F16L 37/05; F16L 5/027; F16L 37/0915; F16L 37/0925; F16L 37/098; E03C 1/021; Y10T 137/698; Y10T 137/684
See application file for complete search history.

(56) References Cited

U.S. PATENT DOCUMENTS

| | | | | |
|---|---|---|---|---|
| 1,631,953 A | ‡ | 6/1927 | Anderson ............... | F16L 37/60 137/361 |
| 2,179,416 A | ‡ | 11/1939 | Malear .................... | F16L 37/60 126/42 |
| 2,236,104 A | ‡ | 3/1941 | McIntosh ................ | F16L 37/60 137/361 |
| 2,256,780 A | ‡ | 9/1941 | McIntosh ................ | F16L 37/60 137/361 |

(Continued)

FOREIGN PATENT DOCUMENTS

| | | | | |
|---|---|---|---|---|
| EP | 0489671 A2 | ‡ | 6/1992 | .............. F16L 37/60 |
| EP | 1087168 A1 | ‡ | 3/2001 | .......... F16L 37/0915 |

(Continued)

*Primary Examiner* — David Colon-Morales
(74) *Attorney, Agent, or Firm* — Alphapatent Associates, Ltd.; Daniel J. Swirsky

(57) ABSTRACT

A wall socket, including a pipes-joint assembly including an outlet push-to-release pipe-joint, an inlet push-to-release pipe-joint, and piping for communicating therebetween, the piping including a right angled bending extending from the outlet push-to-release pipe-joint, and a pipe for extending from the right angled bending to the inlet push-to-release pipe-joint, and a panel, for connecting the pipes-joint assembly thereto, and for disposing the pipe of the pipes-joint assembly parallel to the panel.

5 Claims, 11 Drawing Sheets

(56) References Cited

U.S. PATENT DOCUMENTS

| | | | | |
|---|---|---|---|---|
| 3,695,288 | A | * | 10/1972 | Billeter .................. E03D 5/024 137/360 |
| 4,593,943 | A | ‡ | 6/1986 | Hama ................. F16L 37/0915 285/105 |
| 5,050,632 | A | ‡ | 9/1991 | Means, Jr. ............. E03C 1/021 137/315.01 |
| 5,150,880 | A | ‡ | 9/1992 | Austin, Jr. ............ F16L 37/096 137/614.05 |
| 5,538,033 | A | * | 7/1996 | Condon .................. D06F 39/08 137/360 |
| 5,964,246 | A | ‡ | 10/1999 | Meeker ..................... E03B 7/12 137/360 |
| 6,129,109 | A | ‡ | 10/2000 | Humber .................. D06F 39/08 137/360 |
| 6,612,623 | B2 | ‡ | 9/2003 | Salomon-Bahls .. F16L 37/0915 285/308 |
| 7,308,907 | B2 | ‡ | 12/2007 | Ouyoung ................ E03C 1/021 137/360 |
| 7,314,210 | B2 | ‡ | 1/2008 | Albrecht ................ F16L 37/60 137/360 |
| 7,357,148 | B1 | ‡ | 4/2008 | Gibson ................ E03C 1/021 137/360 |
| 7,530,606 | B1 | ‡ | 5/2009 | Yang ................... F16L 37/0915 285/308 |
| 7,621,569 | B2 | ‡ | 11/2009 | Anthoine ........... F16L 37/0915 285/340 |
| 7,959,138 | B2 | ‡ | 6/2011 | Leonard ................ F16L 37/008 267/122 |
| 8,469,403 | B2 | ‡ | 6/2013 | Benit ..................... E03C 1/021 137/360 |
| 9,290,917 | B2 | ‡ | 3/2016 | Condon .................. E03C 1/021 |
| 9,541,228 | B2 | ‡ | 1/2017 | Bobo .................. F16L 37/0915 |
| 9,556,991 | B2 | ‡ | 1/2017 | Furuya .................. F16L 41/007 |
| 9,580,891 | B2 | ‡ | 2/2017 | Ball .......................... E03B 9/10 |
| 9,725,892 | B2 | ‡ | 8/2017 | Ismert ....................... E03C 1/12 |
| 9,798,330 | B2 | ‡ | 10/2017 | Stinson ................. A61G 12/002 |
| 10,487,484 | B2 | * | 11/2019 | Haynes ................. E03C 1/021 |
| 2003/0001383 | A1 | ‡ | 1/2003 | Halama ............... F16L 37/0915 285/39 |
| 2004/0232697 | A1 | ‡ | 11/2004 | Tomita ............... F16L 37/0915 285/322 |
| 2005/0242581 | A1 | ‡ | 11/2005 | Nowling ............ F16L 37/0925 285/307 |
| 2009/0145493 | A1 | ‡ | 6/2009 | Lee ......................... E03C 1/021 137/360 |
| 2010/0045032 | A1 | ‡ | 2/2010 | Rea ..................... F16L 37/0915 285/319 |
| 2012/0074695 | A1 | ‡ | 3/2012 | Salehi-Bakhtiari ........................ F16L 37/0915 285/377 |
| 2012/0098250 | A1 | ‡ | 4/2012 | Chang ................. F16L 37/0915 285/18 |
| 2012/0161436 | A1 | ‡ | 6/2012 | Salehi-Bakhtiari ........................ F16L 37/0915 285/308 |
| 2012/0235493 | A1 | ‡ | 9/2012 | Kiuchi ...................... H02J 3/32 307/66 |
| 2014/0352798 | A1 | ‡ | 12/2014 | Clarke .................... E03C 1/021 137/15.08 |

FOREIGN PATENT DOCUMENTS

| | | | | | |
|---|---|---|---|---|---|
| FR | 2873185 | A1 | ‡ | 1/2006 | .......... F16L 37/0915 |
| GB | 697010 | A | ‡ | 9/1953 | ............. F16L 37/60 |
| GB | 697010 | A | ‡ | 9/1953 | ............. F16L 37/60 |
| GB | 1335518 | A | ‡ | 10/1973 | ............. F16L 37/60 |
| GB | 2093547 | A | ‡ | 9/1982 | ............. F16L 37/42 |
| GB | 2151734 | A | * | 7/1985 | ............. F16L 29/02 |
| WO | WO-2006057512 | A1 | ‡ | 6/2006 | ............. E03C 1/021 |

* cited by examiner

‡ imported from a related application

WALL SOCKET

CROSS-REFERENCE TO RELATED APPLICATIONS

This application is a Continuation-in-Part of U.S. patent application Ser. No. 15/554,258, which is a U.S. National Phase application under 35 U.S.C. 371 of International Application No. PCT/IL2016/050211, which has an international filing date of Feb. 24, 2016, and which claims priority and benefit from Israel Patent Application No. 237,545, filed Mar. 3, 2015, the contents and disclosure of which are incorporated herein by reference in their entirety.

TECHNICAL FIELD

The present invention relates to the field of sockets of a wall building.

BACKGROUND

Sockets of wall buildings include electrical wall sockets. The wall sockets substantially do not protrude out of the wall, and thus they form part of the building.

Thus, electrical wall sockets are spread all over the walls, even if the implements are not currently connected thereto. The implements are connected and removed by quick connections.

In contrast to electrical infrastructure, water or gas supply sources do not form part of the building. Implements consuming water or gas are rigidly fixed to the supply sources. For an example, a tap is not removably connected to the wall.

SUMMARY

The invention, in embodiments thereof, provides apparatus for removably connecting a water or gas consumer to a wall.

In one aspect of the invention, a wall socket is provided, including a pipes-joint assembly including an outlet push-to-release pipe-joint, an inlet push-to-release pipe-joint, and piping for communicating therebetween, the piping including a right angled bending extending from the outlet push-to-release pipe-joint, and a pipe for extending from the right angled bending to the inlet push-to-release pipe-joint, and a panel, for connecting the pipes-joint assembly thereto, and for disposing the pipe of the pipes-joint assembly parallel to the panel.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention, in embodiments thereof, will be understood from the following detailed description which is meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
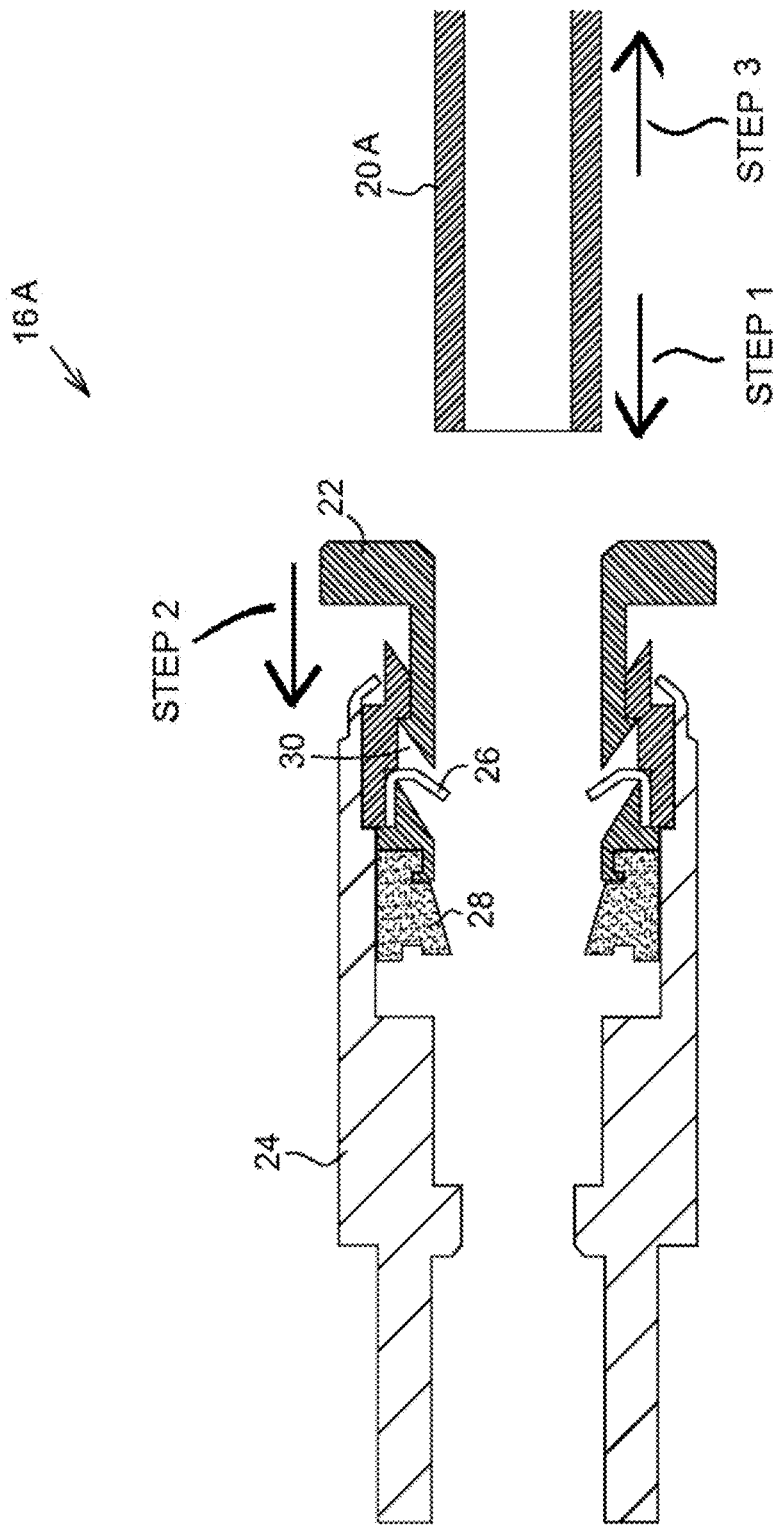
FIG. 1 is a cross-sectional view of a prior art push-to-release pipe-joint.

FIG. 1 is a cross-sectional view of a prior art push-to-release pipe-joint.

The term "push-to-release pipe-joint" refers herein to a joint for connecting thereto a water pipe by pressing the pipe into the joint, and for releasing the water pipe therefrom by pressing a push button thereof.

A prior art push-to-release pipe-joint 16A is intended to connect, in a quick manner, an end of a pipe 20A thereto without tools.

Pipe 20A is sealed to push-to-release pipe-joint 16A by a seal 28. At the first step, upon pressing pipe 20A to the left, pipe 20A crosses a springy hook 26 by pressing it. Springy hook 26 tacks pipe 20A, for not allowing releasing it.

For releasing pipe 20A, at the second step, the user presses a push button 22 having an end 30 being complementary to hook 26, thus pressing hook 26, for ceasing the pressure on pipe 20A. At the third step, the user may pull pipe 20A outside push-to-release pipe-joint 16A.

Figure 2:
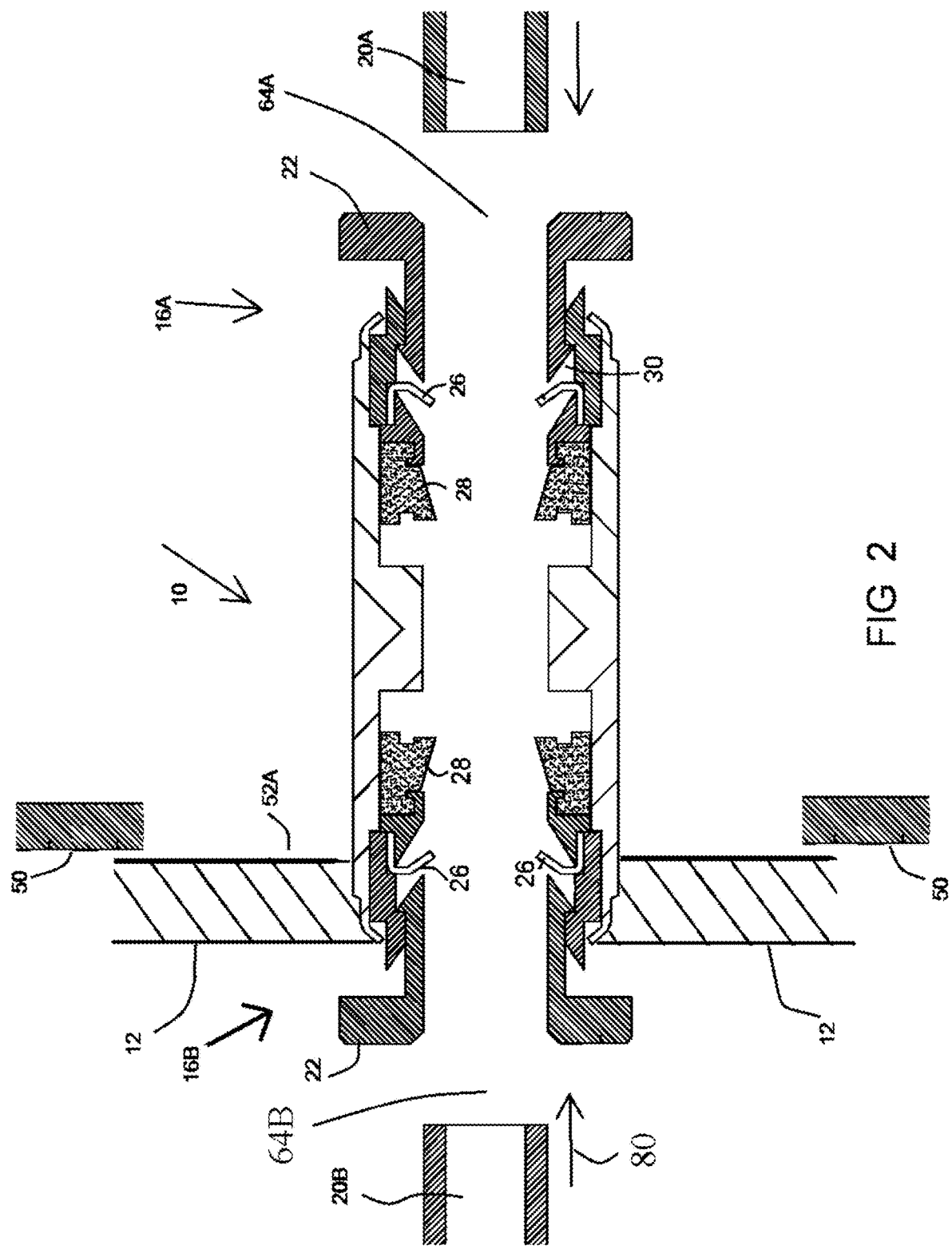
FIG. 2 is a cross-sectional view of a push-to-release pipe-joint, according to one embodiment of the present invention.

FIG. 2 is a cross-sectional view of a push-to-release pipe-joint, according to one embodiment of the present invention.

A wall socket 10 constitutes a female connector, being fixed to the building wall.

In contrast to the common female electrical wall sockets, designed for inserting male plugs thereinto, wall socket 10 constitutes a female water or gas connector, for inserting thereinto a "male" pipe.

Wall socket 10 utilizes the female character of the push-to-release pipe-joint of FIG. 1, for constituting a socket.

Wall socket 10 includes, according to one embodiment of the present invention, at least two prior art push-to-release pipe-joints 16A and 16B of FIG. 1, each facing a different direction; and a perpendicular external panel 12 disposed therebetween.

Wall socket 10 is designed for connecting an inlet pipe 20A from a first direction; for connecting an outlet pipe 20B from a second direction; and for attaching perpendicular external panel 12 to a building wall 50 and parallel thereto.

Figure 3:
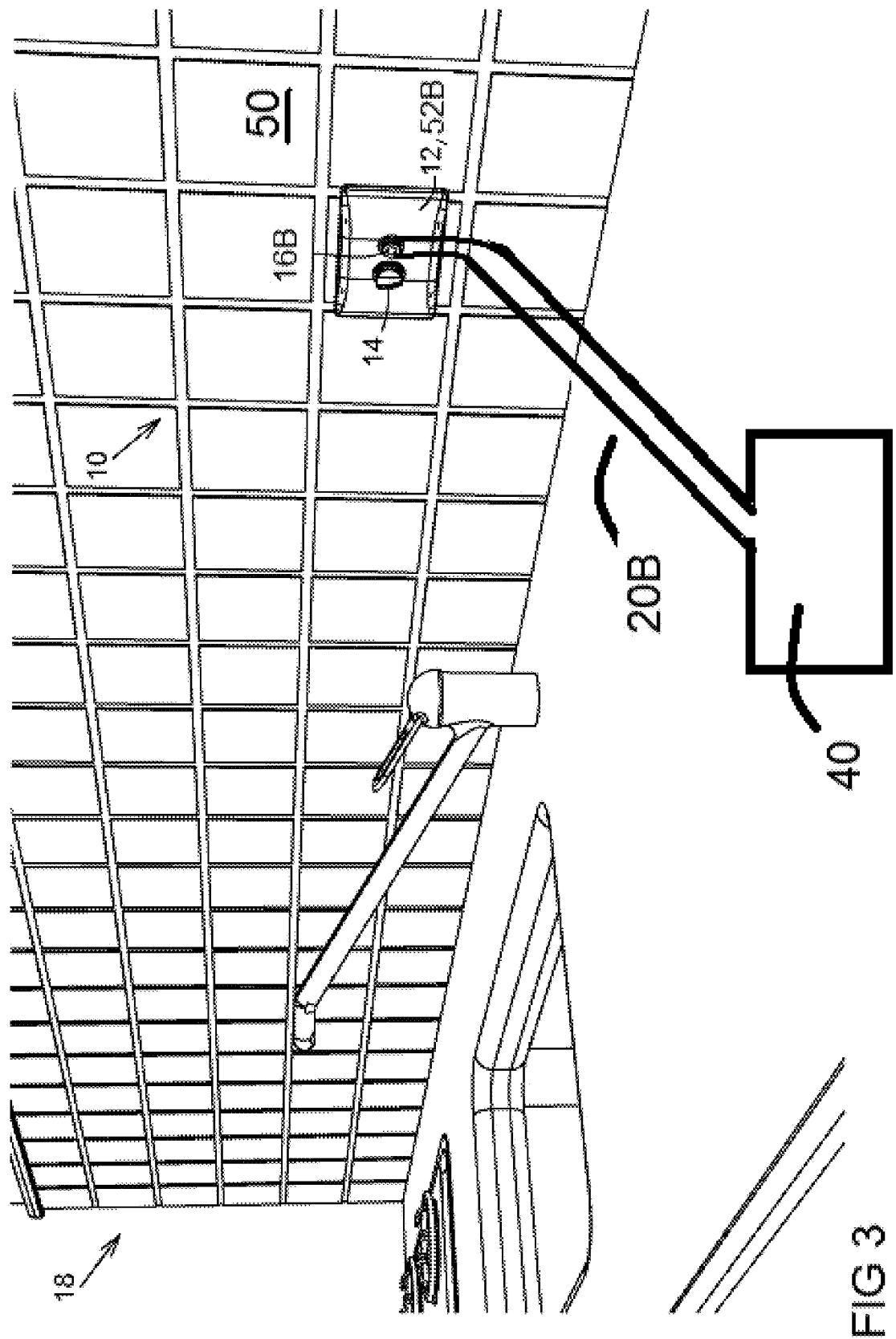
FIG. 3 is a perspective view of the push-to-release pipe-joint of FIG. 2, attached to the building wall depicted in FIG. 2.

FIG. 3 is a perspective view of the push-to-release pipe-joint of FIG. 2, attached to the building wall depicted in FIG. 2.

Wall socket 10 is designed for attaching thereof to wall 50 of a kitchen or any other room 18 of a residence, for allowing a non-professional user, to connect water pipe 20B of an implement 40 to the outlet push-to-release pipe-joint 16B of wall socket 10.

Figure 4:
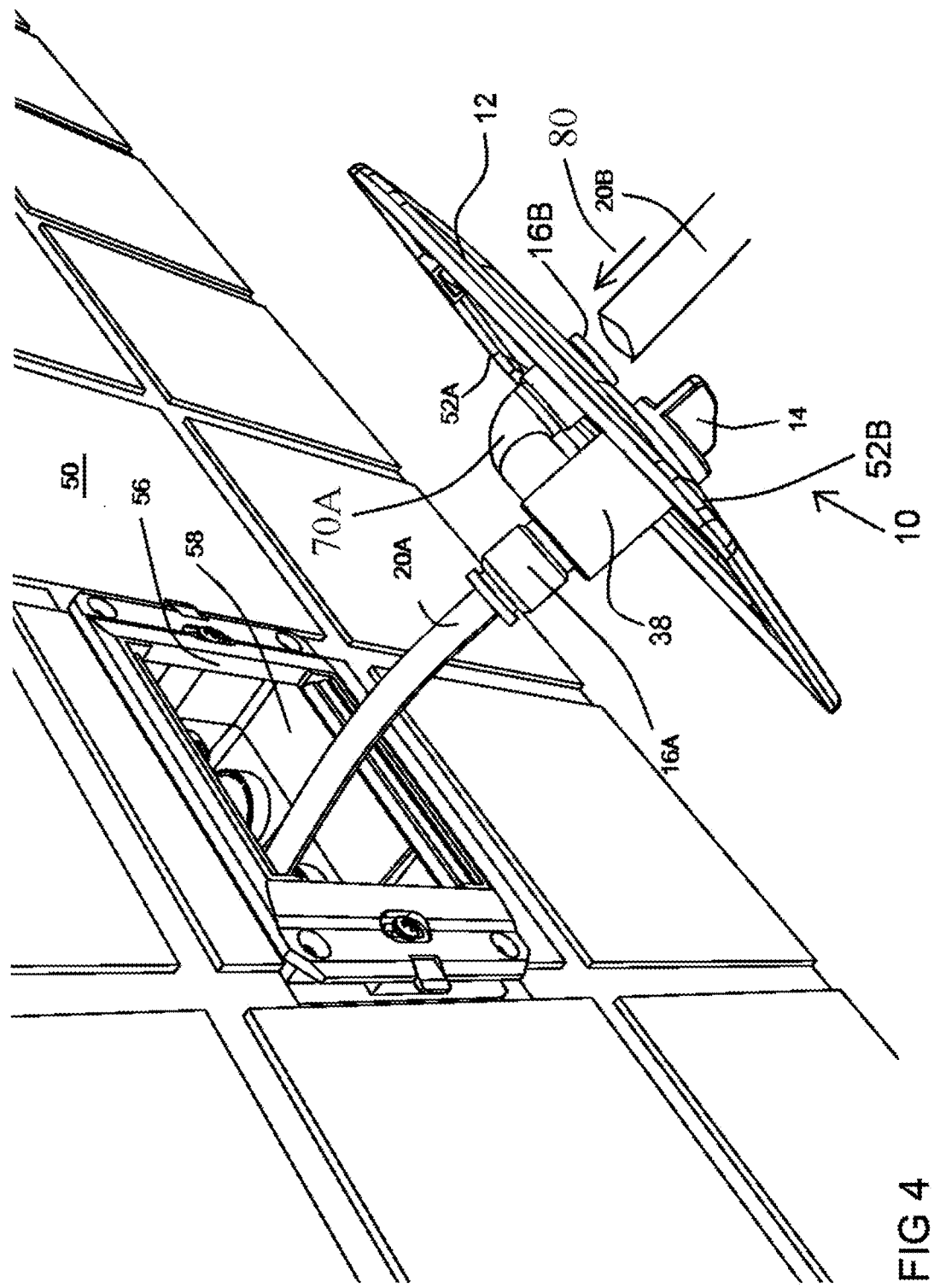
FIG. 4 is a perspective view of the wall socket of FIG. 3, before being attached to the building wall.

FIG. 4 is a perspective view of the wall socket of FIG. 3, before being attached to the building wall.

Wall socket 10 is designed for being connected, by quick connection, to an inlet pipe 20A, to be hidden behind building wall 50 by external panel 12.

According to one embodiment, external panel 12 is disposed proximate to outlet push-to-release pipe-joint 16B, thus outlet push-to-release pipe-joint 16B minimally protrudes from wall 50.

Referring to FIG. 2, only the length of push button 22 must protrude, for allowing pressing push button 22, for allowing releasing outlet pipe 20B.

External panel 12 may be rigidly fixed at least to outlet push-to-release pipe-joint 16B, thus outlet push-to-release pipe-joint 16B is stationary, for allowing inserting outlet pipe 20B.

Wall socket 10 preferably includes a wall connection panel 56, to be inserted into an opening 58 in the building wall 50, and for being rigidly fixed to the opening 58. Wall connection panel 56 is designed for connecting to external panel 12 thereto by snapping means 66 or by simple screwing means, being quick connecting means.

Wall socket 10 may include a faucet 38, for allowing or disallowing water passage from inlet pipe 20A to outlet pipe 20B. Faucet 38 may be operated by a handle 14 being disposed, like outlet push-to-release pipe-joint 16B, on the external side 52B of external panel 12.

Figure 5:
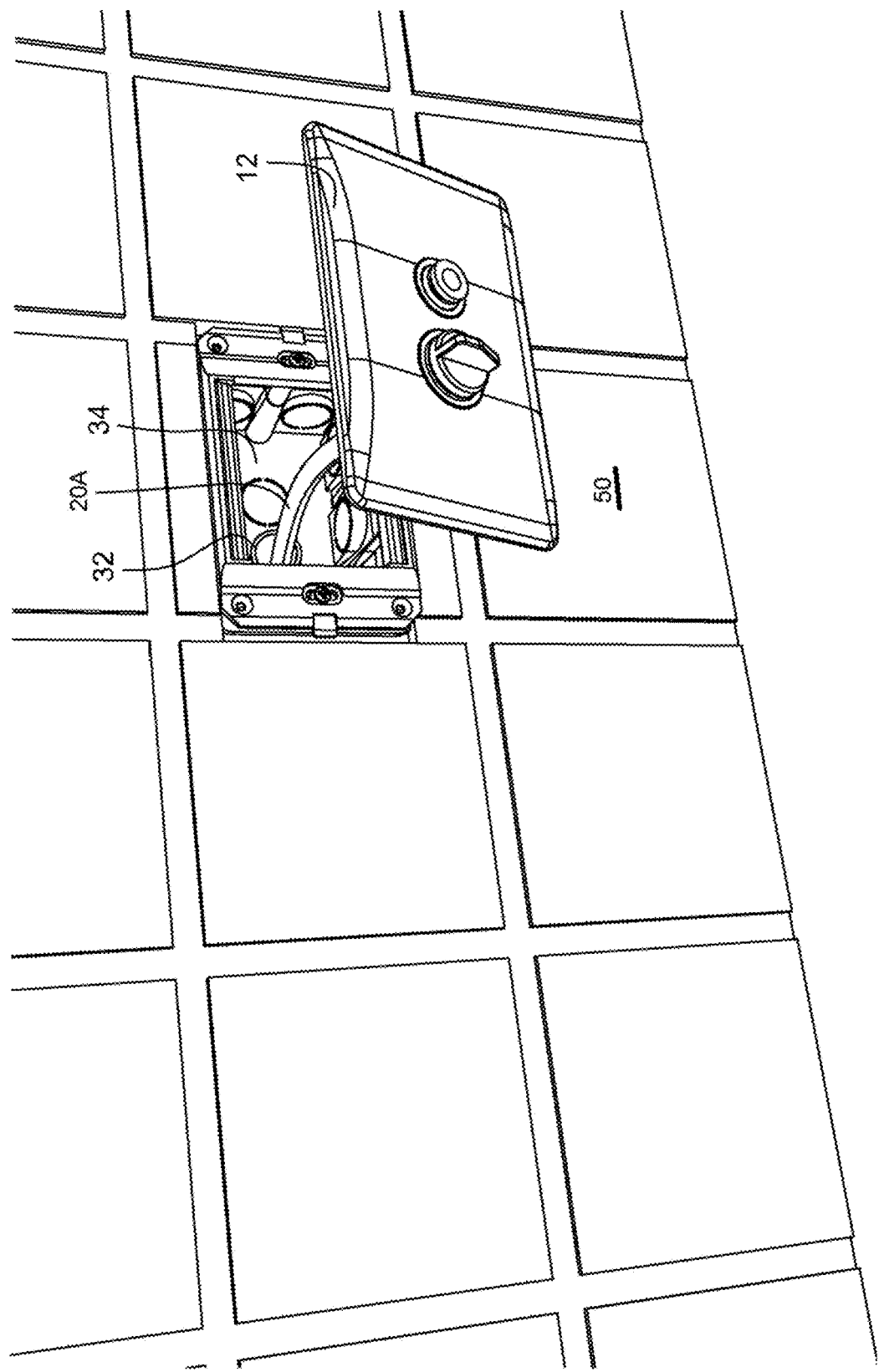
FIG. 5 is another view of FIG. 4.

FIG. 5 is another view of FIG. 4.

Inlet pipe 20A preferable is hidden behind building wall 50, may be threaded into a housing pipe 32.

Figure 6:
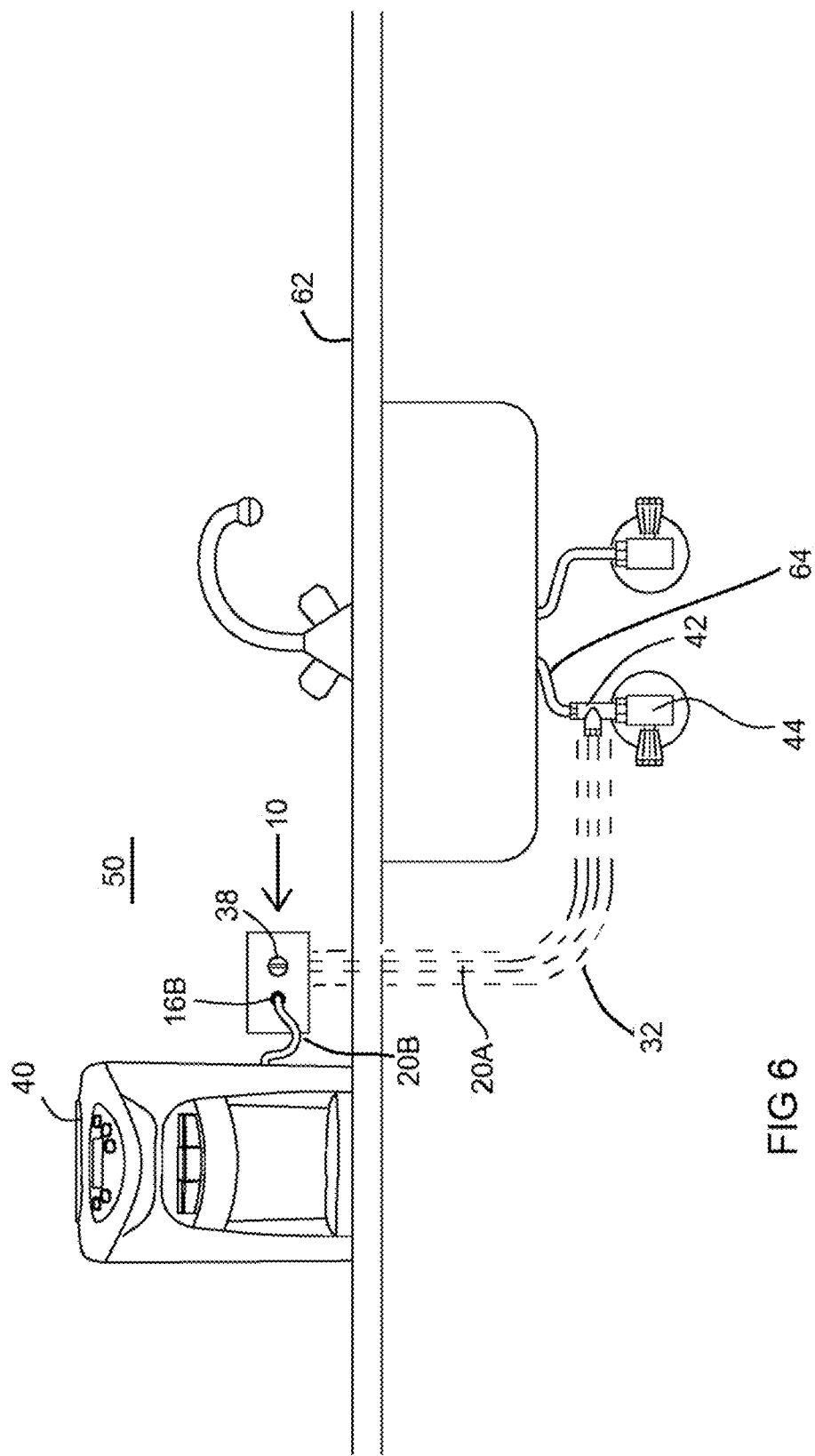
FIG. 6 is a plumbing diagram, for utilizing the wall socket of FIG. 2.

FIG. 6 is a plumbing diagram, for utilizing the wall socket of FIG. 2.

In modern kitchen topology, the water is supplied by a water supply source 44, represented by a faucet, disposed below the working surface 62, to a tap 60, laid on the working surface 62, through a pipe 64 crossing the working surface 62 through a hole in working surface.

Wall socket 10 allows supplying the water from water supply source 44, represented by a faucet, disposed below working surface 62, to implement 40, such as a minibar or a refrigerator, disposed above working surface 62, through inlet pipe 20A, without making a hole in working surface, for crossing working surface 62, since inlet pipe 20A is installed behind or within wall 50.

Inlet pipe 20A disposed behind or within building wall 50, extends from a splitting element 42, splitting the water supply from water supply source 44 to wall socket 10 installed to building wall 50.

Referring again to FIG. 4, external panel 12 may include a depression 70A for supporting outlet push-to-release pipe-joint 16B.

Figure 7:
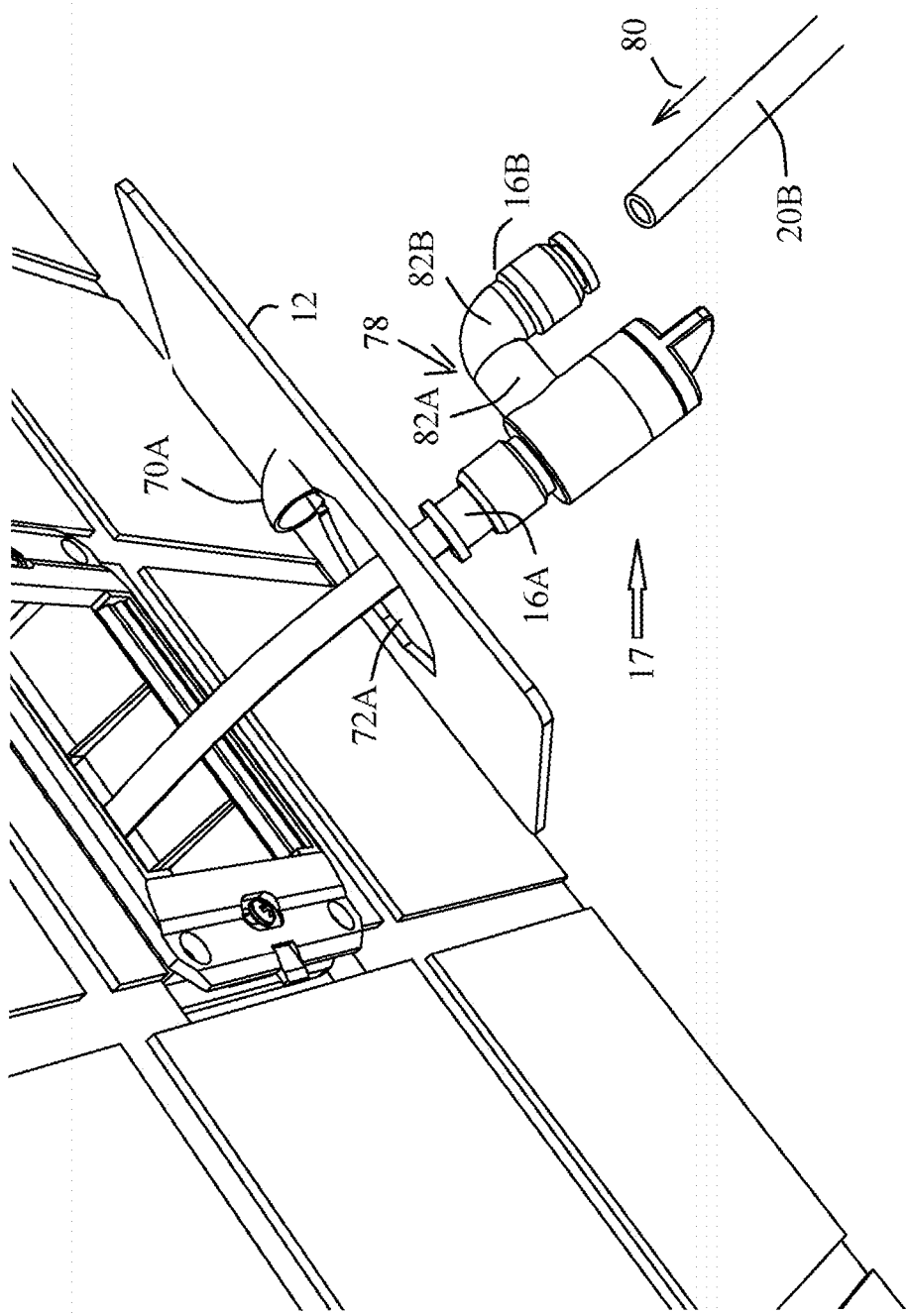
FIG. 7 is a perspective view of the wall socket of FIG. 4, prior to being attached to the building wall.

FIG. 7 is a perspective view of the wall socket of FIG. 4, prior to being attached to the building wall.

A pipes-joint assembly 17 includes outlet push-to-release pipe-joint 16B; inlet push-to-release pipe-joint 16A; and piping 78 disposed therebetween for communicating therebetween.

Figure 8:
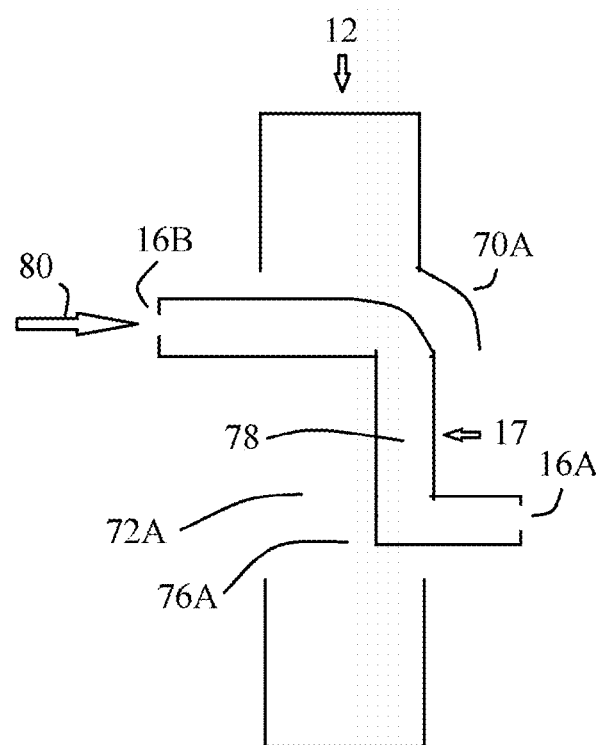
FIG. 8 is a side view of the wall socket of FIG. 7, upon attaching the pipes-joint assembly of FIG. 7 to the external panel.

FIG. 8 is a side view of the wall socket of FIG. 7, upon attaching the pipes-joint assembly of FIG. 7 to the external panel.

External panel 12 is designed to be disposed between push-to-release pipe-joints 16A and 16B, thus pipes-joint assembly 17 traverses external panel 12 through a hole 72A of external panel 12 including a traversing zone 76A, while depression 70A extending from external panel 12 supports outlet push-to-release pipe-joint 16B against manual pressing 80.

Figure 9:
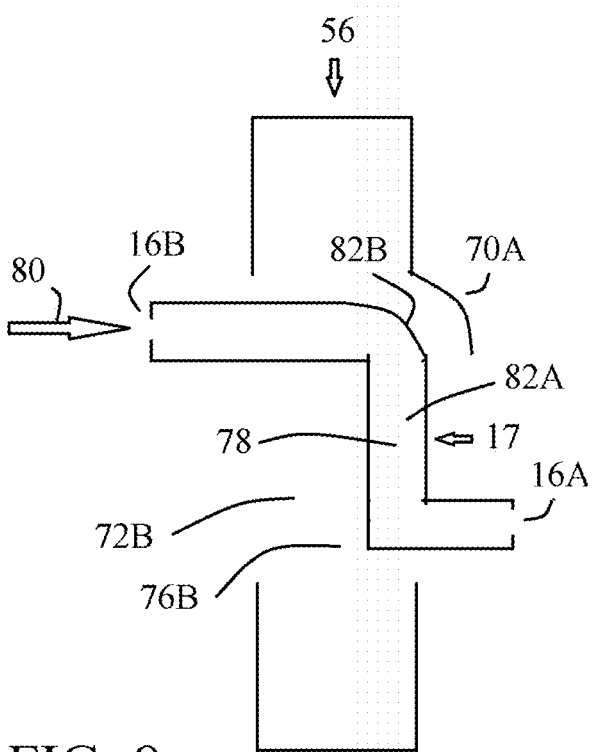
FIG. 9 is a side view of the wall socket according to another embodiment.

FIG. 9 is a side view of the wall socket according to another embodiment.

According to another embodiment, wall connection panel 56 is designed to be disposed between push-to-release pipe-joints 16A and 16B, thus pipes-joint assembly 17 traverses wall connection panel 56.

Namely, inlet push-to-release pipe-joint 16A of pipes-joint assembly 17 traverses through a traversing zone 76B of hole 72B of wall connection panel 56, while a depression 70B extending from wall connection panel 56 supports outlet push-to-release pipe-joint 16B.

Even though pipes-joint assembly 17 traverses wall connection panel 56 thus pipes-joint assembly 17 apparently could have been simply straight like in FIG. 2, piping 78 of pipes-joint assembly 17 includes a right angled bending 82B extending from outlet push-to-release pipe-joint 16B, for being supported by depression 70B of wall connection panel 56; and a pipe 82A, for being disposed parallel to wall connection panel 56, as shown in FIG. 9.

Figure 10:
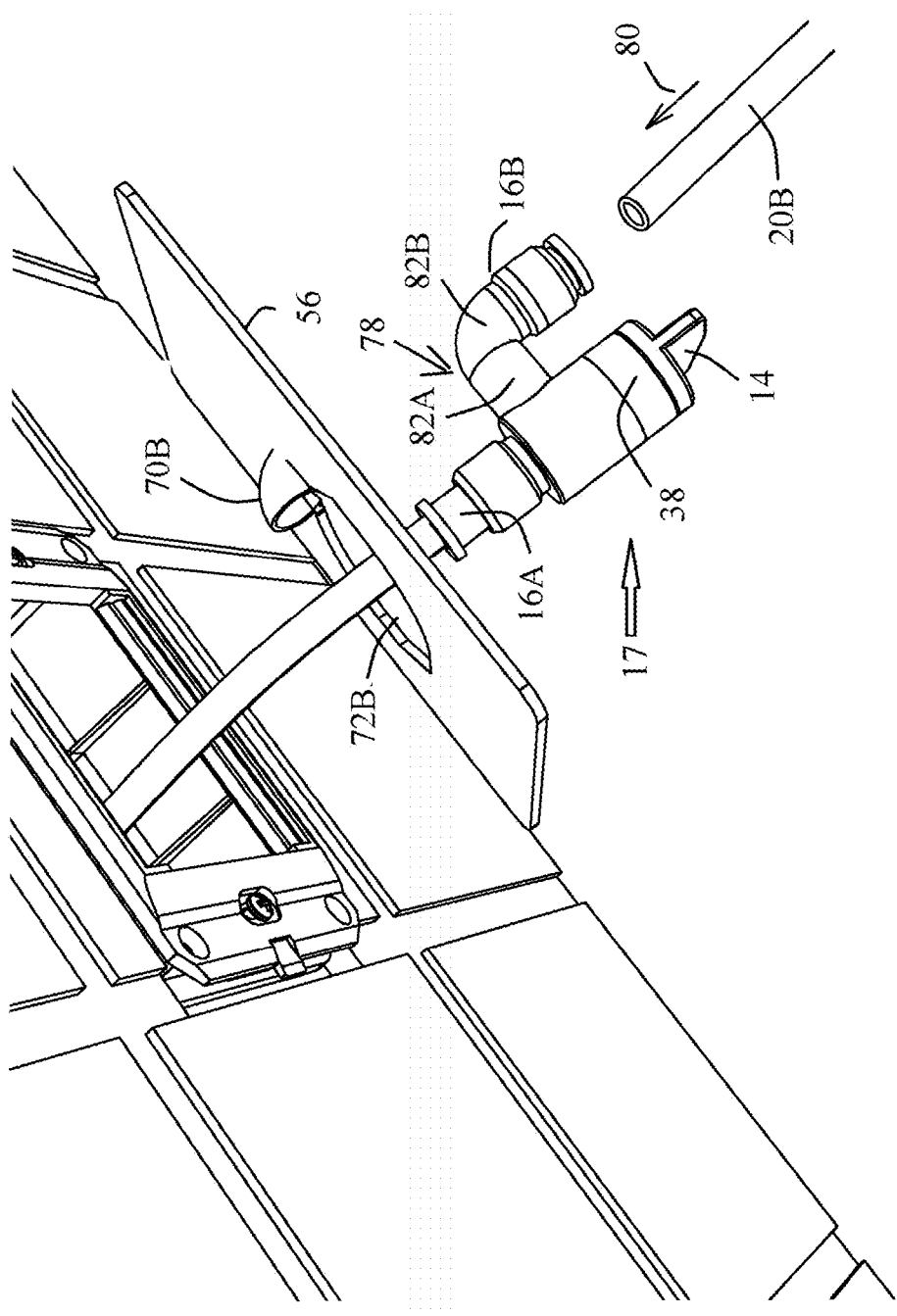
FIG. 10 is a perspective view of the wall socket of FIG. 9, prior to being attached to the building wall.

FIG. 10 is a perspective view of the wall socket of FIG. 9, prior to being attached to the building wall.

Depression 70B is shaped three-dimensionally complementary to bending 82B, for housing and reducing mechanical freedom therebetween upon inserting bending 82B into depression 70B by pressing (80) outlet pipe 20B onto outlet push-to-release pipe-joint 16B. In particular, depression 70B avoids moving outlet push-to-release pipe-joint 16B by rotation of handle 14 of faucet 38 to avoid rotation of outlet push-to-release pipe-joint 16B in relation to inlet push-to-release pipe-joint 16A.

Figure 11:
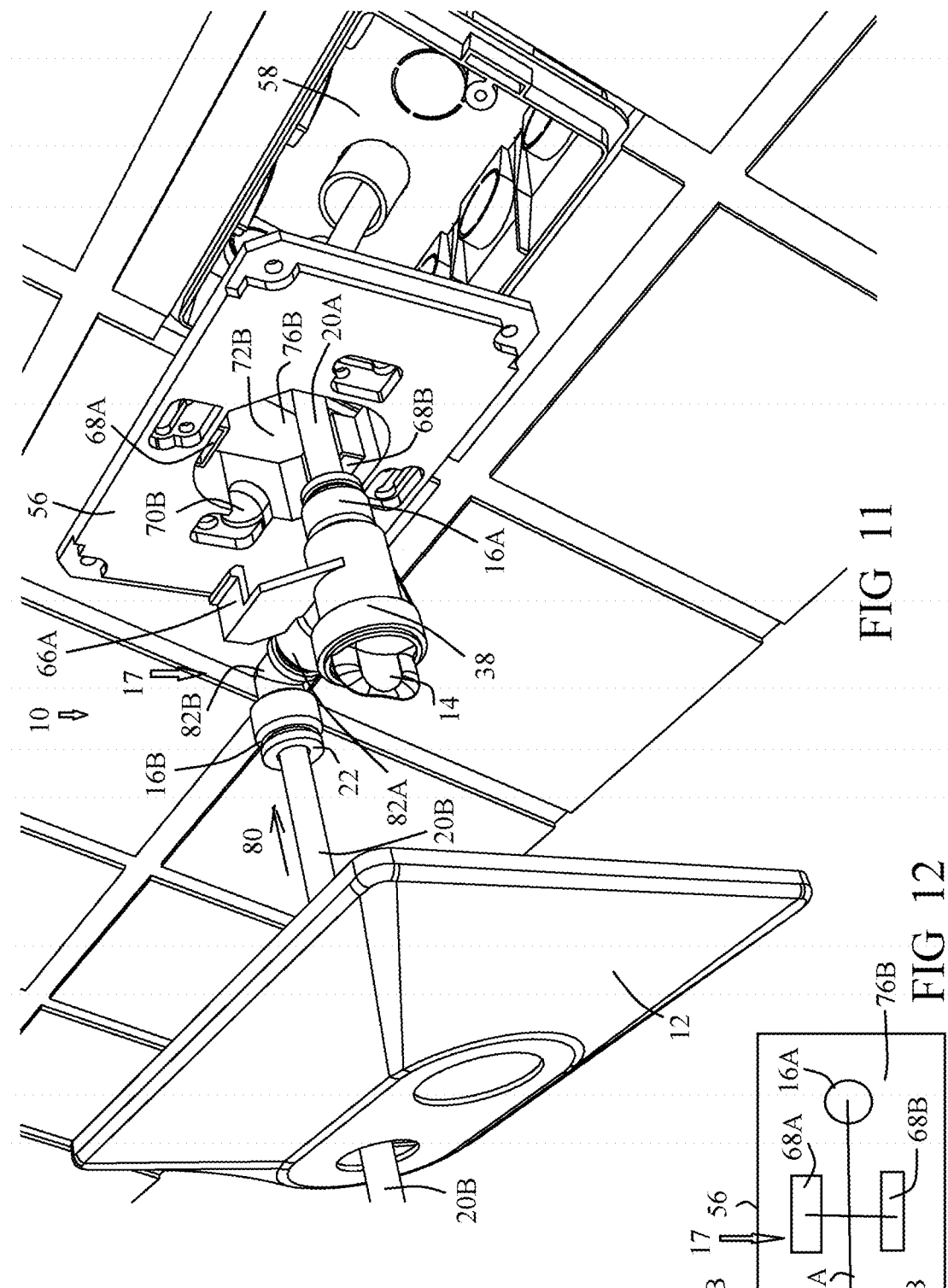
FIG. 11 is a perspective view of the wall socket of FIG. 9, prior to being attached to the building wall.

FIG. 11 is a perspective view of the wall socket of FIG. 9, prior to being attached to the building wall.

In addition to supporting bending 82B of pipes-joint assembly 17 on depression 70B of wall connection panel 56, pipes-joint assembly 17 further includes snapping members 66A and 66B extending from pipe 82A, designed for snapping complementary snapping members 68A and 68B respectively of wall connection panel 56.

According to this embodiment, external panel 12 is not fixed to push-to-release pipe-joint 16B or to pipes-joint assembly 17, and does include any connection means thereto.

Outlet push-to-release pipe-joint 16B is being pressed 80 by the user, by pressing outlet pipe 20B onto push-to-release pipe-joint 16B for connecting thereto, thus push-to-release pipe-joint 16B requires and receives a massive support, being depression 70B.

Figure 12:
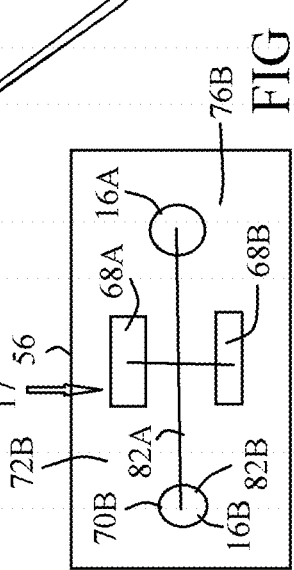
FIG. 12 is a schematic top view of the pipes-joint assembly and the connection box of FIG. 10.

FIG. 12 is a schematic top view of the pipes-joint assembly and the connection box of FIG. 10.

Outlet 16B push-to-release pipe-joint 16B and bending 82B of pipes-joint assembly 17 are thus supported by depression 70B of wall connection panel 56; pipe 82B of pipes-joint assembly 17 is thus supported by snapping members 68A and 68B respectively of wall connection panel 56; and inlet 16A push-to-release pipe-joint 16A of pipes-joint assembly 17 traverses traversing zone 76B of hole 72B of wall connection panel 56, rather than being supported by wall connection panel 56.

Figure 13:
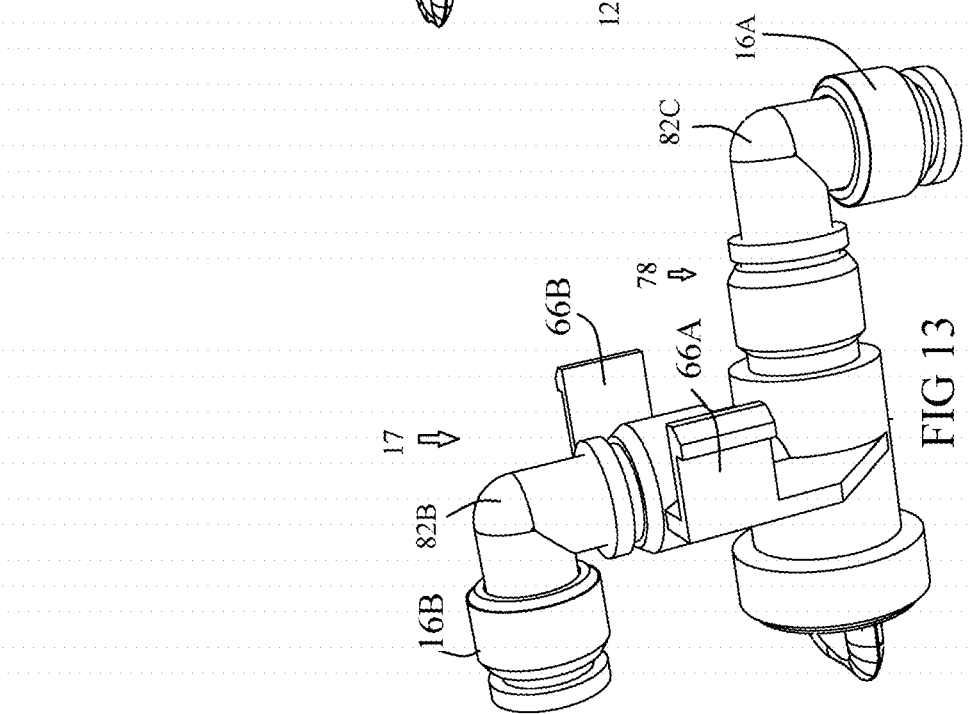
FIG. 13 is a perspective view of the pipes-joint assembly of FIG. 11.

FIG. 13 is a perspective view of the pipes-joint assembly of FIG. 11.

Figure 14:
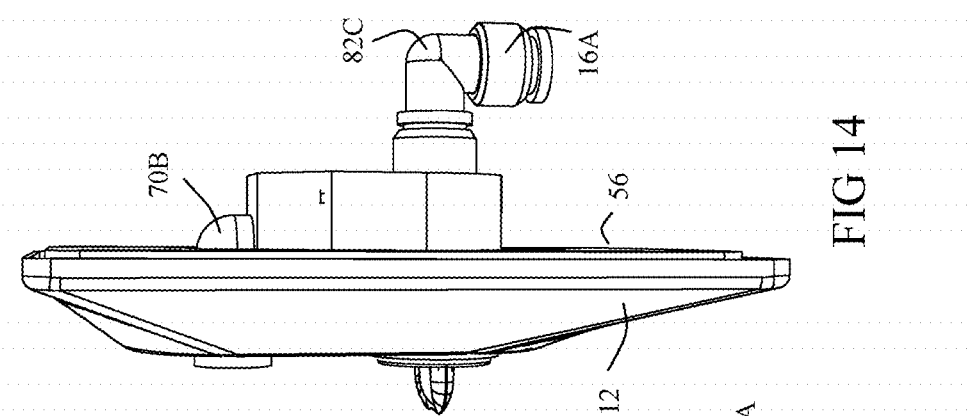
FIG. 14 is a perspective view of the wall socket showing the external panel of FIG. 11, the wall connection panel of FIG. 11, and the pipes-joint assembly of FIG. 13, all connected together.

FIG. 14 is a perspective view of the wall socket showing the external panel of FIG. 11, the wall connection panel of FIG. 11, and the pipes-joint assembly of FIG. 13, all connected together.

Piping 78 of pipes-joint assembly 17 may further include another right angled bending 82C extending from inlet push-to-release pipe-joint 16A, for providing compactness.

Figure 15:
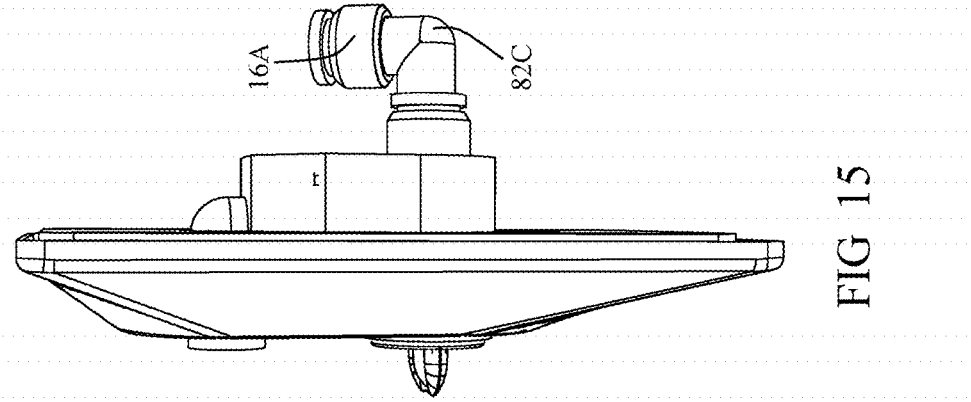
FIG. 15 is a perspective view of FIG. 14 upon rotating the inlet push-to-release pipe-joint.

FIG. 15 is a perspective view of FIG. 14 upon rotating the inlet push-to-release pipe-joint.

Right angled bending 82C allows rotating inlet push-to-release pipe-joint 16A, thus to increase the compactness.

Thus, according to one embodiment, the invention is directed to a wall socket (10), including:
  a pipes-joint assembly (17) including an outlet push-to-release pipe-joint (16B), an inlet push-to-release pipe-joint (16A), and piping (78) for communicating therebetween, the piping (78) including a first right angled bending (82B) extending from the outlet push-to-release pipe-joint (16B), and a pipe (82A) for extending from the first right angled bending (82B) to the inlet push-to-release pipe-joint (16A);
  a panel (12, 56), for connecting the pipes-joint assembly (17) thereto, and for disposing the pipe (82A) of the pipes-joint assembly (17) parallel to the panel (12, 56), the panel (12,56) including:
    a) a hole (72A, 72B), for being disposed between the outlet push-to-release pipe-joint (16B) and the inlet push-to-release pipe-joint (16A), for disposing the outlet push-to-release pipe-joint (16B); and
    b) a depression (70A, 70B) extending from the hole (72A, 72B) and shaped complementary to the first right angled bending (82B) for housing thereof, thereby supporting the outlet push-to-release pipe-joint (16B) extending therefrom,
thereby the first right angled bending (82B) and the depression (70B, 70B) support the outlet push-to-release pipe-joint (16B) upon pressing (80) an outlet pipe (20B) onto the outlet push-to-release pipe-joint (16B) for connecting thereto.

The piping (78) of the pipes-joint assembly (17) may further include a faucet (34) including a rotatable handle (14), thereby the housing of the depression (70A, 70B) avoids rotating the outlet push-to-release pipe-joint (16B) in relation to the inlet push-to-release pipe-joint (16A), by the rotating of the handle (14).

The pipes-joint assembly (17) may further include fastening members (66A, 66B) extending from the pipe (82A) of the pipes-joint assembly (17), for being fastened to complementary fastening members (68A, 68B) of the panel (12, 56), thereby the outlet push-to-release pipe-joint (16B) and the pipe (82A) of the pipes-joint assembly (17) may be supported by the panel (12, 56), whereas the inlet push-to-release pipe-joint (16A) traverses the panel (12, 56).

The panel (12, 56) may constitute panel 56 for being fixed to a building wall (50), and/or panel 12 being external to the user.

The piping (78) may include a second right angled bending (82C) extending from the inlet push-to-release pipe-joint (16A), thereby providing compactness.

In the figures and/or description herein, the following reference numerals (Reference Signs List) have been mentioned:
  numeral 10 denotes a wall socket, according to one embodiment of the present invention; in contrast to electric wall sockets, this is a water or gas water socket; like electric sockets, this socket as well does not protrude from the wall;
  numeral 12 denotes the external panel being attached to the building wall;
  numeral 14 denotes the handle of the faucet of the wall socket;
  numeral 16A denotes the push-to-release pipe-joint being disposed behind the external panel;
  numeral 16B denotes the push-to-release pipe-joint being partly disposed in front of the external panel, and being accessible for quick connection by a non-professional user;
  numeral 17 denotes a pipes-joint assembly, including push-to-release pipe-joints 16A and 16B.
  numeral 18 denotes the kitchen or any other room;
  numeral 20A denotes the inlet pipe for providing water to the wall socket;
  numeral 20B denotes the outlet pipe for supplying water from the wall socket;
  numeral 22 denotes the push button, for releasing the pipe from the push-to-release pipe-joint of the wall socket or of a prior art push-to-release pipe-joint;
  numeral 26 denotes the springy hook, for tacking the pipe to the push-to-release pipe-joint of the wall socket or to the prior art push-to-release pipe-joint;
  numeral 28 denotes the seal, for sealing the pipe to the push-to-release pipe-joint of the wall socket or to the prior art push-to-release pipe-joint;
  numeral 30 denotes the end of the push button of the push-to-release pipe-joint of the wall socket or of the prior art push-to-release pipe-joint;
  numeral 32 denotes a housing pipe;
  numeral 38 denotes a faucet of the wall socket;
  numeral 40 denotes an implement needing water or gas supply;
  numeral 42 denotes a piping splitting element;
  numeral 44 denotes the water source; it is represented by a faucet;
  numeral 50 denotes the building wall;
  numeral 52A denotes the side of the external panel, facing the building wall;
  numeral 52B denotes the side of the external panel, opposing the building wall, and being exposed to the user;
  numeral 56 denotes installation means for installing pipes-joint assembly 17 to the building wall; the connection means may constitute a wall connection panel, being similar to a wall connection panel serving an electrical socket;
  numeral 58 denotes an opening in the building wall;
  numeral 60 denotes a tap;
  numeral 62 denotes a working surface, such as of a kitchen; the wall socket of the present invention eliminates the need to make a hole in the working surface, for supplying water to the implement; thus the wall socket constitutes a preparation to the kitchen, making the installation of the implement, and removal thereof, immediate;

numeral 64A denotes the inlet of the wall socket; and numeral 64B denotes the outlet of the wall socket.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A wall socket, comprising:
   a pipes-joint assembly comprising an outlet push-to-release pipe-joint, an inlet push-to-release pipe-joint, and piping for communicating therebetween, said piping comprising a first right angled bending extending from said outlet push-to-release pipe-joint, and a pipe for extending from said first right angled bending to said inlet push-to-release pipe-joint; and
   a panel, for connecting said pipes-joint assembly thereto, and for disposing said pipe of said pipes-joint assembly parallel to said panel, said panel comprising:
   a hole, for being disposed between said outlet push-to-release pipe-joint and said inlet push-to-release pipe-joint, for disposing said outlet push-to-release pipe-joint; and
   a depression extending from said hole and shaped complementary to said first right angled bending for housing thereof, thereby supporting said outlet push-to-release pipe-joint extending therefrom,
   thereby said first right angled bending and said depression support said outlet push-to-release pipe-joint upon pressing said outlet push-to-release pipe-joint for connecting an outlet pipe thereto.

2. The wall socket according to claim 1, wherein said piping of said pipes-joint assembly further comprises a faucet comprising a rotatable handle, thereby said housing of said depression avoids rotating said outlet push-to-release pipe-joint in relation to said inlet push-to-release pipe-joint, by said rotating of said handle.

3. The wall socket according to claim 1, wherein said pipes-joint assembly further comprises fastening members extending from said pipe of said pipes-joint assembly, for being fastened to complementary fastening members of said panel, thereby said outlet push-to-release pipe-joint and said pipe of said pipes-joint assembly are supported by said panel, whereas said inlet push-to-release pipe-joint traverses said panel.

4. The wall socket according to claim 1, wherein said panel includes a member selected from a group consisting of: a panel for being fixed to a building wall, a panel being external to a user.

5. The wall socket according to claim 1, wherein said piping comprises a second right angled bending extending from said inlet push-to-release pipe-joint.

* * * * *